United States Patent
Callaghan

(10) Patent No.: US 8,903,875 B2
(45) Date of Patent: Dec. 2, 2014

(54) METHOD FOR IDENTIFYING CORRESPONDING DIRECTORIES IN A UNION-MOUNTED FILE SYSTEM

(71) Applicant: Apple Inc., Cupertino, CA (US)

(72) Inventor: Brent P. Callaghan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 13/690,733

(22) Filed: Nov. 30, 2012

(65) Prior Publication Data

US 2014/0156695 A1 Jun. 5, 2014

(51) Int. Cl.
*G06F 17/30* (2006.01)

(52) U.S. Cl.
CPC .............................. *G06F 17/30106* (2013.01)
USPC ........................................ 707/822; 707/829

(58) Field of Classification Search
CPC ................................................ G06F 17/30233
USPC .................................................. 707/822, 829
See application file for complete search history.

(56) References Cited

U.S. PATENT DOCUMENTS

| | | | |
|---|---|---|---|
| 5,465,365 A * | 11/1995 | Winterbottom | 1/1 |
| 7,293,033 B1 * | 11/2007 | Tormasov et al. | 707/608 |
| 7,783,665 B1 * | 8/2010 | Tormasov et al. | 707/783 |
| 8,166,063 B2 | 4/2012 | Andersen et al. | |
| 8,332,441 B2 * | 12/2012 | Aurora | 707/821 |
| 2002/0138559 A1 | 9/2002 | Ulrich et al. | |
| 2004/0098415 A1 * | 5/2004 | Bone et al. | 707/200 |
| 2012/0136843 A1 * | 5/2012 | Bone et al. | 707/694 |
| 2012/0254140 A1 | 10/2012 | Srinivasaraghavan et al. | |

OTHER PUBLICATIONS

Pendry, Jan-Simon et al., "Union Mounts in 4.4BSD-Lite," downloaded from http://static.usenix.org/publications/library/proceedings/neworl/full_papers/mckusick.a, Nov. 16, 2012, 13 pages.

* cited by examiner

*Primary Examiner* — Leslie Wong
(74) *Attorney, Agent, or Firm* — Blakely, Sokoloff, Talor & Zafman LLP

(57) ABSTRACT

In one embodiment, in response to a request for searching a file stored in a first directory, a first lookup is performed by a virtual file system in a first file system to locate the file. The virtual file system traverses from the first directory back to a mount point of the first file system to recreate a search path from the mount point to the first directory. The virtual file system performs a second lookup in a second directory of a second file system that is associated with the mount point to locate the file in the second file system, where second directory is identified by the recreated search path.

21 Claims, 5 Drawing Sheets

METHOD FOR IDENTIFYING CORRESPONDING DIRECTORIES IN A UNION-MOUNTED FILE SYSTEM

FIELD OF THE INVENTION

Embodiments of the present invention relate generally to file systems. More particularly, embodiments of the invention relate to techniques for identifying corresponding directories in a union-mounted file system.

BACKGROUND

Computer systems generally store files on storage devices such as disk drives, where the files are managed by a file system. A file system is a means to organize data expected to be retained after a program terminates by providing procedures to store, retrieve and update data as well as manage the available space on the device(s) which contain it. A file system organizes data in an efficient manner and is tuned to the specific characteristics of the device. A tight coupling usually exists between the operating system and the file system. Some file systems provide mechanisms to control access to the data and metadata. Ensuring reliability is a major responsibility of a file system. Some file systems allow multiple programs to update the same file at nearly the same time. A file system typically includes many directories organized in a hierarchy. For example, the file system may have a root directory, the root directory may have sub-directories, and the sub-directories of the root directory may in turn have sub-directories, etc. Each file in the file system may be specified by a pathname that indicates the hierarchical sequence of directories that lead to the file.

For each file, the file system stores a set of data blocks for the file, as well as metadata for accessing and managing the file. Each directory in the file system may include a table of directory entries that maps the names of the files and sub-directories in that directory to their corresponding modes (or other file metadata structures). In some file systems, a directory is implemented as a special type of file that simply lists the directory entries. For each file in the directory, the directory entry for the file simply maps the name of the file to the mode number of the file's mode. A software application may access a file if it knows the pathname of the file. For example, the sequence of directories leading to the file may be traversed until the file's directory is reached.

Before a file system can be utilized, the file system has to be mounted by the operating system via a mount point. A mount point is a physical location in the partition used as a root file system. Many different types of storage exist. Before any of them can be used for storage, the means by which information is read and written must be organized and knowledge of this must be available to the operating system via a file system. Each different file system provides the host operating system with metadata so that it knows how to read and write data. When the medium is mounted, this metadata is read by the operating system so that it can use the storage.

Today, an operating system may support multiple different file systems. The multiple file systems can be union mounted via a union mount point such that all files and directories can be represented in a unified view. A union mount is a file system mount in a computer that allows all the different mounts to overlay one another. A regular mount allows each to exist in its own realm. With a union mount, all the files from each mount are accessible. At the same time, some files may be masked if they have the same name as files from the top-most mount, because the top mount takes priority. When a file system mount is performed, each mount is positioned in a different place in the computer's memory, so none of the mounts interferes with another. With a union mount, each of the mounts is overlaid on top of one another so, while the mounts exist in different areas of the memory, they are organized in a fashion that enables users to access all of them.

FIG. 1 is a block diagram illustrating a typical union-mounted file system. Referring to FIG. 1, in this example, file systems 101 and 102 are union mounted via union mount 103. When a user initiates a search for a file object, in this example, " . . . /X/Y/Z/Bar," the search component of an operating system performs a search in file system 101 via path 106, starting from root 104. Note that in this example, root 104 is also a mount point of file system 101. When the search fails to find file object "Bar," the search logic finds file system 102 via path 107, where file system 102 is mounted via mount point 105. The search logic then searches at the root level of file system 102 via path 108 for file object "Bar." The union mount of a traditional file system typically only maintains links to root directories of all the file systems that have been union mounted. As a result, the subdirectories of a union mounted file system other than the primary file system will not be searched. In this example, the search logic never finds file object "Bar" even though file object "Bar" is stored in the same directory of . . . /X/Y/Z/Bar under file system 102.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when the search logic fails to find the file requested in a specified directory of a first file system (e.g., higher order file system), the search logic performs a reverse lookup (e.g., from a child directory to a parent directory) back to the nearest mount point. Along the way of the reverse lookup, the search logic builds a path in reverse. Typically, the root directories of the files systems have links identifying the corresponding other union mounted file systems (e.g., lower order file systems). The search logic follows the link from the nearest mount point to a second file system (e.g., lower order file system) and performs a second look up in the path that has been obtained via the reverse lookup in the first file system. The search logic then returns the search result accordingly.

Figure 1:
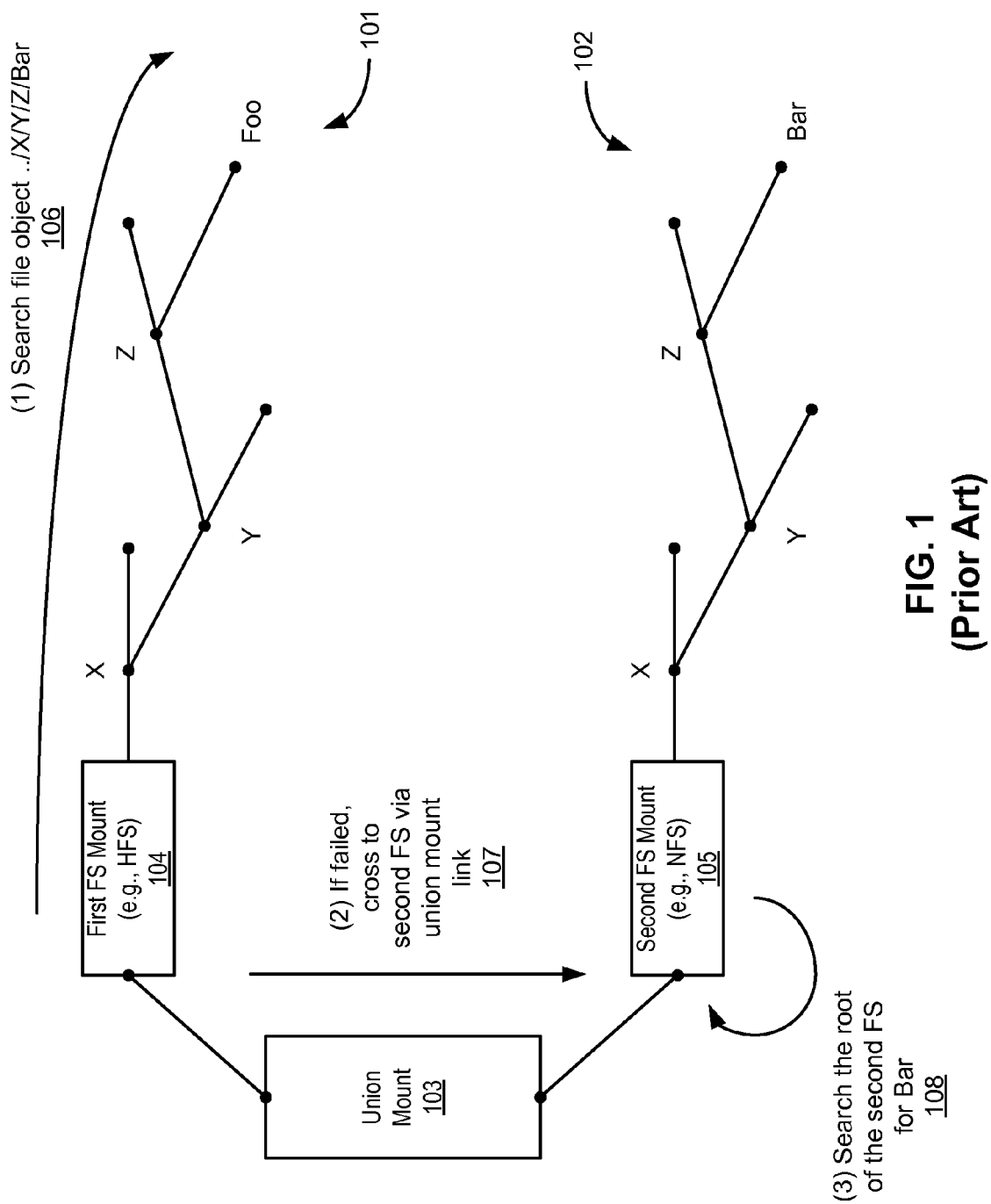
FIG. 1 is a block diagram illustrating a typical union-mounted file system (Prior Art).
Figure 2:
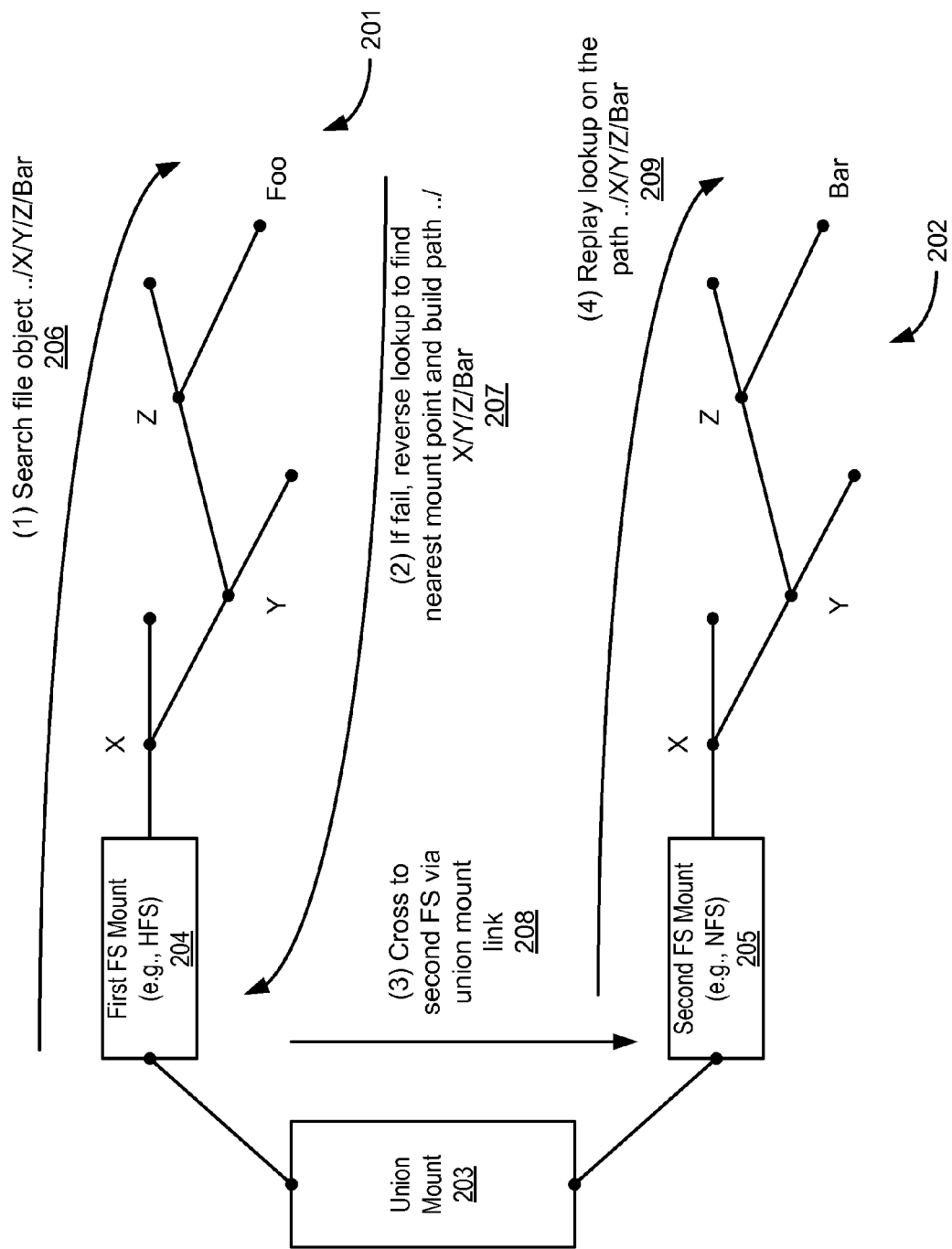
FIG. 2 is a block diagram illustrating an example of a union-mounted file system process according to certain embodiments of the invention.

FIG. 2 is a block diagram illustrating an example of a union-mounted file system process according to one embodiment of the invention. Referring to FIG. 2, similar to the configuration as shown in FIG. 1, file system 201 is union mounted with file system 202 via union mount mechanism 203. Union mount 203 includes a union mount directory listing representing the concatenation of an upper directory with its corresponding lower directory or directories. File system 201 is mounted via mount point 204 while file system 202 is mounted via mount point 205. In this example, file system 201 may include many directories in addition to directories X, Y, and Z. Similarly, file system 202 may include many directories in addition to directories X, Y, and Z. When a search is conducted for search a file, in this example, "Bar" in directory " . . . /X/Y/Z," the search logic searches from a first file system (e.g., the highest order file system) root 204 via path 206. The search logic starts from the mount point (e.g., the root of file system 201) searching for directory X. Typically, search logic performs a lookup operation in directory entries of root directory 204, where directory entries serve as table content for the files and any subdirectories. Once directory X is found, the search logic searches for directory Y (e.g., subdirectory or child directory), and so on, until directory Z is found. At directory Z, if file "Bar" is found, information of file "Bar", such as file object pointer or handle, or content of the file, is returned.

If the file being searched, in this example, file "Bar," cannot be found in directory Z, according to one embodiment, search logic performs a reverse lookup via path 207 to locate the nearest file system mount point from directory Z. Similar to a forward lookup, the search logic will look at the directory entries of each directory to find a parent directory and find the nearest mount point of the file system. In this example, the nearest mount point with respect to directory " . . . /X/Y/Z/ Bar" is at directory 204. In one embodiment, along the reverse lookup, the search logic also recreates the original search path from the nearest mount point to directory Z (e.g., . . . /X/Y/ Z/Bar). Once the search logic reaches mount point 204, it locates the union mount link and finds mount point 205 of second file system 202 via path 208. Once it reaches root directory 205 of file system 202, the search logic performs another forward lookup according to the search path (e.g., . . . /X/Y/Z/Bar) that was recreated during the reverse lookup of first file system 201 to find file "Bar." If the file is found, the information of the file is returned; otherwise, an error may be returned. Note that there may be more than two file systems that have been union mounted. The search logic may continue searching for rest of the file systems using the above techniques.

Figure 3:
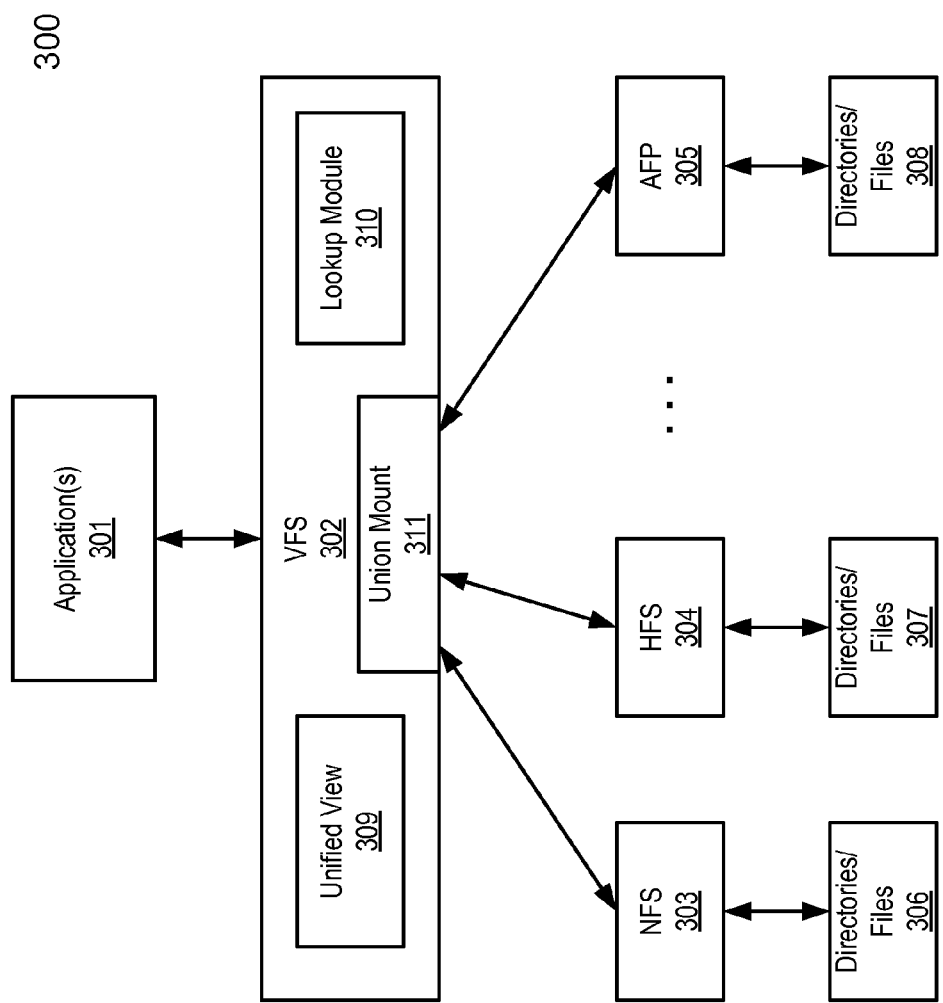
FIG. 3 is a block diagram illustrating file system architecture according to one embodiment of the invention.

FIG. 3 is a block diagram illustrating file system architecture according to one embodiment of the invention. File system 300 may be part of file systems as shown in FIG. 2. Referring to FIG. 3, system 300 includes, but is not limited to, multiple file systems 303-305 that are union mounted via union mount 311 and represented by virtual file system (VFS) 302. VFS 302 presents a unified view 309 of file systems 303-305 to one or more applications 301 to allow applications 301 to access directories and/or files 306-308, respectively. Directories and/or files 306-308 may be stored in one or more storage devices, which may be located locally and/or remotely over a network. File systems 303-305 may represent any file system, such as, for example, a hierarchical file system (HFS), a network file system (NFS), a new technology file system (NTFS), Apple Filling Protocol (AFP), server message block (SMB), Web distributed authoring and versioning (WebDAV), etc.

A virtual file system is an abstraction layer on top of a more concrete file system. The purpose of a VFS is to allow client applications (e.g., applications 301) to access different types of concrete file systems (e.g., file systems 303-305) in a uniform way. A VFS can, for example, be used to access local and network storage devices transparently without the client application noticing the difference. It can be used to bridge the differences in different file systems, so that applications can access files on local file systems of those types without having to know what type of file system they are accessing. A VFS specifies an interface between the kernel of an operating system and a concrete file system. Therefore, it is easy to add support for new file system types to the kernel simply by fulfilling the contract.

In one embodiment, VFS 302 includes lookup module 310 to perform a lookup on a file across multiple union mounted file systems as described above. Specifically, when lookup module 310 fails to find the file requested in the specified directory of a first file system (e.g., higher order file system), lookup module 310 performs a reverse lookup back to the nearest mount point. Along the way of the reverse lookup, lookup module 310 builds a path in reverse. Lookup module 310 follows the union mount link from the nearest mount point to a second file system (e.g., lower order file system) and performs a second look up in the path that has been obtained via the reverse lookup in the file system. Lookup module 310 then returns the search result accordingly.

Figure 4:
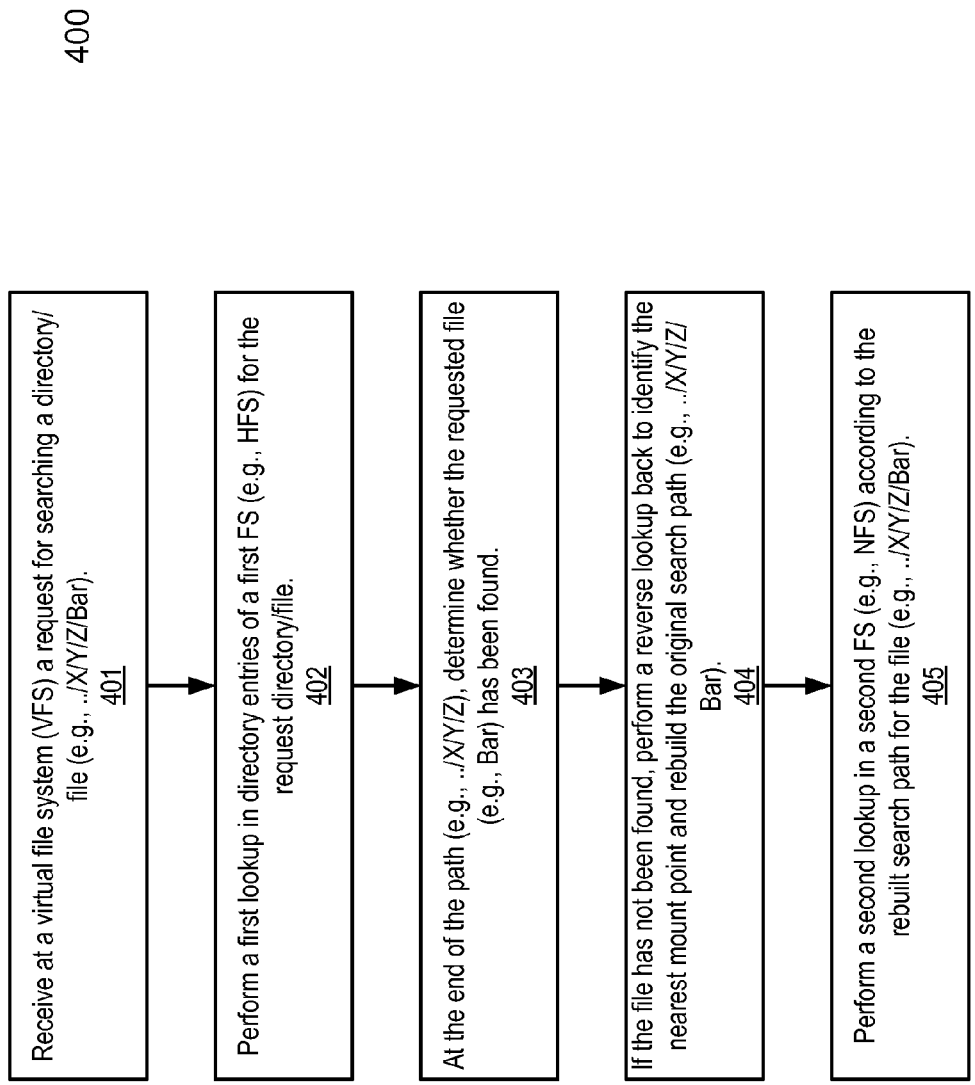
FIG. 4 is a flow diagram illustrating a method for search a file in union-mounted file systems according to one embodiment.

FIG. 4 is a flow diagram illustrating a method for search a file in union-mounted file systems according to one embodiment. Method 400 may be performed by processing logic which may include software, hardware, or a combination thereof. For example, method 400 may be performed by system 300 of FIG. 3. Referring to FIG. 4, at block 401, processing logic receives a request for searching a directory/ file (e.g., . . . /X/Y/Z/Bar). At block 402, processing logic performs a first lookup in a first file system (e.g., file system 201 of FIG. 2) for the requested directory/file. At the end of the path, at block 403, processing logic determines whether the requested file (e.g., Bar) has been found. If the file has not been found, at block 404, processing logic performs a reverse lookup to identify the nearest mount point (e.g., directory 204 of FIG. 2) and rebuilds the original search path (e.g., . . . /X/Y/Z/Bar) of the first file system. At block 405, processing logic performs a second lookup in a second file system (e.g., file system 202 of FIG. 2) according to the rebuilt path (e.g., . . . /Y/Z/Bar).

Figure 5:
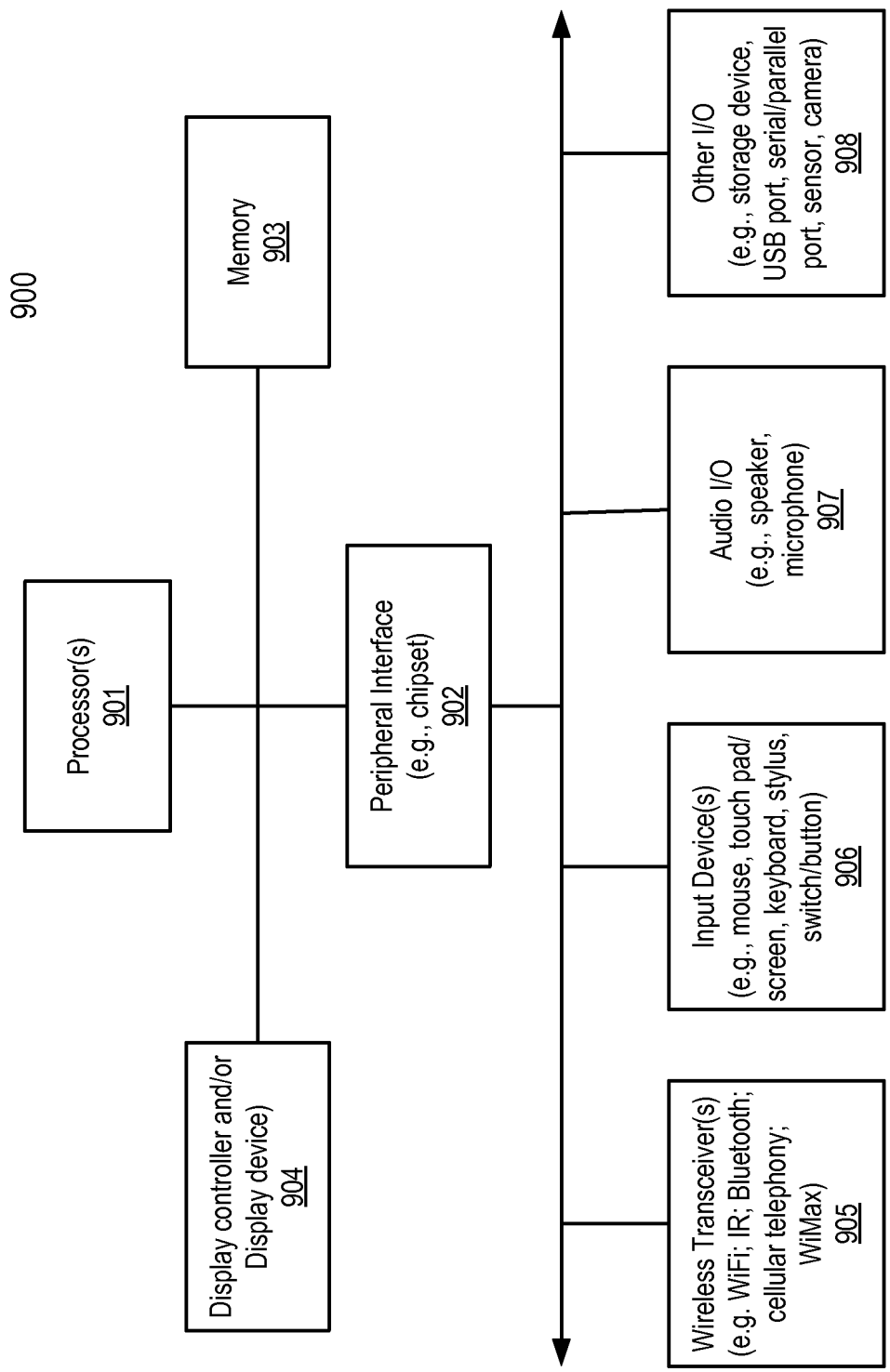
FIG. 5 is a block diagram illustrating an example of a data processing system which may be used with one embodiment of the invention.

FIG. 5 is a block diagram illustrating an example of a data processing system which may be used with one embodiment of the invention. System 900 may represents any of data processing systems described above performing any of the processes or methods described above. For example, system 900 may have an operating system such as system 300 of FIG. 3 executed therein. System 900 may represent a desktop (e.g., iMac™ available from Apple Inc. of Cupertino, Calif.), a laptop (e.g., MacBook™), a tablet (e.g., iPad™) a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 5, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 5 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
providing a union mount of multiple file systems, including at least a first file system and a second file system, for a unified view of files and directories of the multiple file systems, the multiple file systems overlaid in the unified view, each of the multiple file systems having a mount point in the union mount, wherein the multiple file systems include a priority order, files of a common name between the file systems masked in the unified view according to the priority order, wherein the first file system is of a higher priority than the second file system according to the priority order;
in response to a request for searching a file having a path via the unified view, performing a first lookup in a first directory of the first file system according to the path to locate the file;
traversing, if the first lookup fails to locate the file in the first directory of the first file system, from the first directory back to a mount point of the first file system to recreate a search path from the mount point to the first directory; and
performing a second lookup in a second directory of the second file system to locate the file in the second file system, wherein the second directory is identified by the recreated search path.

2. The method of claim 1, wherein the request is received by a virtual file system (VFS) of an operating system, and wherein the first and second lookups are performed by the VFS in the first and second file systems, respectively.

3. The method of claim 2, wherein the first file system and the second file system are union mounted.

4. The method of claim 2, wherein the VFS includes a union mount point that references to mount points of the first and second file systems.

5. The method of claim 2, further comprising incorporating, by the VFS, lookup results of the first and second file systems to provide a unified file system view.

6. The method of claim 1, wherein traversal of the search path is performed only if the first directory does not contain the file.

7. The method of claim 1, wherein the first and second file systems are different types of file systems.

8. A non-transitory computer-readable medium having instructions stored therein, which when executed by a computer, cause the computer to perform a method, the method comprising:
providing a union mount of multiple file systems, including at least a first file system and a second file system, for a unified view of files and directories of the multiple file systems, the multiple file systems overlaid in the unified view, each of the multiple file systems having a mount point in the union mount, wherein the multiple file systems include a priority order, files of a common name between the file systems masked in the unified view according to the priority order, wherein the first file system is of a higher priority than the second file system according to the priority order;
in response to a request for searching a file having a path via the unified view, performing a first lookup in a first directory of the first file system according to the path to locate the file;
traversing, if the first lookup fails to locate the file in the first directory of the first file system, from the first directory back to a mount point of the first file system to recreate a search path from the mount point to the first directory; and
performing a second lookup in a second directory of the second file system to locate the file in the second file system, wherein the second directory is identified by the recreated search path.

9. The non-transitory computer-readable medium of claim 8, wherein the request is received by a virtual file system (VFS) of an operating system, and wherein the first and second lookups are performed by the VFS in the first and second file systems, respectively.

10. The non-transitory computer-readable medium of claim 9, wherein the first file system and the second file system are union mounted.

11. The non-transitory computer-readable medium of claim 9, wherein the VFS includes a union mount point that references to mount points of the first and second file systems.

12. The non-transitory computer-readable medium of claim 9, wherein the method further comprises incorporating, by the VFS, lookup results of the first and second file systems to provide a unified file system view.

13. The non-transitory computer-readable medium of claim 8, wherein traversal of the search path is performed only if the first directory does not contain the file.

14. The non-transitory computer-readable medium of claim 8, wherein the first and second file systems are different types of file systems.

15. A data processing system, comprising:
a processor; and
a memory having instructions stored therein, which when executed from the memory, cause the processor to
provide a union mount of multiple file systems, including at least a first file system and a second file system, for a unified view of files and directories of the multiple file systems, the multiple file systems overlaid in the unified view, each of the multiple file systems having a mount point in the union mount, wherein the multiple file systems include a priority order, files of a common name between the file systems masked in the unified view according to the priority order, wherein the first file system is of a higher priority than the second file system according to the priority order, in response to a request for searching a file having a path via the unified view, perform a first lookup in a first directory of the first file system according to the path to locate the file, traverse, if the first lookup fails to locate the file in the first directory of the first file system, from the first directory back to a mount point of the first file system to recreate a search path from the mount point to the first directory, and perform a second lookup in a second directory of the second file system to locate the file in the second file system, wherein the second directory is identified by the recreated search path.

16. The system of claim 15, wherein the request is received by a virtual file system (VFS) of an operating system, and wherein the first and second lookups are performed by the VFS in the first and second file systems, respectively.

17. The system of claim 16, wherein the first file system and the second file system are union mounted.

18. The system of claim 16, wherein the VFS includes a union mount point that references to mount points of the first and second file systems.

19. The system of claim 16, wherein the VFS incorporates lookup results of the first and second file systems to provide a unified file system view.

20. The system of claim 15, wherein traversal of the search path is performed only if the first directory does not contain the file.

21. The system of claim 15, wherein the first and second file systems are different types of file systems.

* * * * *